(12) United States Patent
Wade

(10) Patent No.: US 11,747,226 B2
(45) Date of Patent: Sep. 5, 2023

(54) LOAD CELL

(71) Applicant: Honeywell International Inc., Charlotte, NC (US)

(72) Inventor: Richard Wade, Worthington, OH (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/484,295

(22) Filed: Sep. 24, 2021

(65) Prior Publication Data

US 2022/0011178 A1 Jan. 13, 2022

Related U.S. Application Data

(63) Continuation of application No. 16/379,604, filed on Apr. 9, 2019, now Pat. No. 11,156,511.

(51) Int. Cl.
| | |
|---|---|
| *G01L 1/22* | (2006.01) |
| *G01L 1/18* | (2006.01) |
| *G01L 5/00* | (2006.01) |

(52) U.S. Cl.
CPC .............. *G01L 1/2293* (2013.01); *G01L 1/18* (2013.01); *G01L 1/2206* (2013.01); *G01L 5/0033* (2013.01); *G01L 5/0038* (2013.01)

(58) Field of Classification Search
CPC ....... G01L 1/2293; G01L 1/18; G01L 1/2206; G01L 5/0033; G01L 5/0038
See application file for complete search history.

(56) References Cited

U.S. PATENT DOCUMENTS

| | | | |
|---|---|---|---|
| 2,992,556 | A | 7/1961 | Webster |
| 4,454,771 | A | 6/1984 | Shimazoe et al. |
| 4,986,130 | A | 1/1991 | Engelhaupt et al. |
| | | (Continued) | |

FOREIGN PATENT DOCUMENTS

| | | |
|---|---|---|
| CN | 204064539 U | 12/2014 |
| CN | 107543639 A | 1/2018 |
| | (Continued) | |

OTHER PUBLICATIONS

Decision to grant a European patent received for European Application No. 20168095.6, dated Sep. 23, 2021, 2 pages.
(Continued)

*Primary Examiner* — Kristina M Deherrera
*Assistant Examiner* — Jean F Morello
(74) *Attorney, Agent, or Firm* — Alston & Bird LLP

(57) ABSTRACT

The load cell for measuring a force in both push and pull includes a body assembly having a body element defining a measurement chamber with a closed end and an opposite open end, a protruding member positioned within the measurement chamber and extending from the closed end toward the open end. The load cell also includes a base assembly secured at the open end of the body element, including a base element; and a sense die attached to the base element and aligned with the protruding member, where a top surface of the sense die supports a Wheatstone bridge circuit configured to generate a signal based on a force exerted by the protruding member on the sense die. The body element, the protruding member and the base element are integrally formed from a common material which has a CTE close to the CTE of the sense die.

20 Claims, 3 Drawing Sheets

(56) References Cited

U.S. PATENT DOCUMENTS

| | | | |
|---|---|---|---|
| 5,116,331 A * | 5/1992 | Chapman | G01L 19/0092 73/756 |
| 5,644,285 A | 7/1997 | Maurer | |
| 5,945,732 A * | 8/1999 | Burns | H01L 23/49582 361/813 |
| 7,723,232 B2 * | 5/2010 | Legat | B81C 1/00158 438/689 |
| 2004/0085012 A1 * | 5/2004 | Chen | H01J 31/127 313/493 |
| 2011/0000318 A1 | 1/2011 | Bradley et al. | |
| 2013/0247690 A1 | 9/2013 | Wade | |
| 2015/0068315 A1 | 3/2015 | Davis et al. | |
| 2015/0276517 A1 | 10/2015 | Ashida et al. | |
| 2015/0276533 A1 * | 10/2015 | Belov | G01R 33/07 324/252 |
| 2018/0180494 A1 | 6/2018 | Speldrich et al. | |
| 2019/0360883 A1 * | 11/2019 | Bertone | G01L 19/04 |

FOREIGN PATENT DOCUMENTS

| | | | |
|---|---|---|---|
| EP | 1519173 A1 | 3/2005 | |
| EP | 2199770 A2 | 6/2010 | |
| EP | 3063517 A1 | 9/2016 | |
| EP | 3252449 A1 | 12/2017 | |
| WO | 95/05589 A1 | 2/1995 | |
| WO | WO-9505589 A1 * | 2/1995 | G01L 1/2231 |
| WO | 2015/065639 A1 | 5/2015 | |

OTHER PUBLICATIONS

Extended European Search Report issued in European Application No. 21181247.4 dated Nov. 5, 2021, 7 pages.

Notification to Grant Patent Right issued in Chinese Application No. 202010277633.2 dated Sep. 30, 2021, 4 pages.

Communication about intention to grant a European patent dated May 3, 2021 for EP Application No. 20168095.6, 5 pages.

Extended European Search Report for Patent Application No. 20168095.6 dated Sep. 1, 2020, 6 pages.

Intention to grant (signatures) dated May 3, 2021 for EP Application No. 20168095.6.

Non-Final Rejection dated Mar. 30, 2021 for U.S. Appl. No. 16/379,604.

Notice of Allowance received for U.S. Appl. No. 16/379,604, dated Jun. 25, 2021, 7 pages.

Notice of Allowance received for U.S. Appl. No. 16/379,604, dated Sep. 1, 2021, 2 pages.

Notice of Publication and Entry into Examination Stage issued in Chinese Application No. 202010277633.2 dated Oct. 26, 2020, 2 pages.

Office Action issued in Chinese Application No. 202010277633.2 dated Jun. 29, 2021, 23 pages.

U.S. Appl. No. 16/379,604, filed Apr. 9, 2019, U.S. Pat. No. 11,156,511, Patented.

Office Action received for European Application No. 21181247.4, dated Nov. 7, 2022, 5 pages.

* cited by examiner

LOAD CELL

CROSS REFERENCE TO RELATED APPLICATIONS

This application is a continuation of and claims priority to U.S. application Ser. No. 16/379,604, titled "LOAD CELL," filed Apr. 9, 2019, the contents of which are incorporated herein by reference in their entirety.

FIELD OF THE INVENTION

The present disclosure relates generally to force sensors, and more particularly, to multi-range force sensor metrology apparatus.

BACKGROUND OF THE INVENTION

In many industrial areas it is necessary to accurately measure the magnitude of a force. Force sensors in load cells can be used to measure a force or a pressure. Various load cell designs can be used and can rely on a displacement of a component or a stress-field applied to a stress-sensitive element or component in a load cell to measure the presence and/or magnitude of a force applied to the sensor.

Measurement of a broad range of pressures or force is particularly challenging because of an enormous range of pressures that have to be realized. Particularly in high pressure loading scenarios, force sensors such as load cells may be damaged by forces exceeding the intended operating range of the force sensors (e.g., overforce situations). Load cells are critical apparatuses for the metrology of force or pressure. Conventional pressure sensors for example as described in US Patent Publ. No. 2015/0068315, US Patent Publ. No. 2018/0180494A1 and European Patent No. EP2199770, are characterized by an extremely limited range of pressure measurement capabilities and often cannot be operated to measure both push force and pull force due to their technical designs. In addition, beam deflection-type force sensors incorporated into load cells have been a standard load cell configuration for accommodating wide measurement ranges. More recent silicon die stress sensors have limitations in force ranges and are generally unable to measure pulling forces.

Based on the foregoing, a need exists for an improved multi-range pressure sensor in a load cell apparatus that is capable of efficiently and accurately detecting a broad range of push and pull forces.

BRIEF SUMMARY OF THE INVENTION

A load cell is disclosed for measuring a force in both push and pull applications. The load cell includes a body assembly having a body element defining a measurement chamber with a closed end and an opposite open end, a protruding member positioned within the measurement chamber and extending from the closed end toward the open end. The load cell also includes a base assembly secured at the open end of the body element, wherein the base assembly comprises: a base element; and a sense die attached to the base element and aligned with the protruding member, where a top surface of the sense die supports a Wheatstone bridge circuit configured to generate a signal based at least in part on a force exerted by the protruding member on the sense die.

According to the embodiments, a method of measuring a force in a load cell includes: providing a body element defining a measurement chamber having a closed end and an opposite open end, wherein the body element comprises a protruding member positioned within the measurement chamber and extending from the closed end toward the open end; and a base assembly secured at the open end of the body element, wherein the base assembly comprises: a base element; and a sense die attached to the base element and aligned with the protruding member, wherein a top surface of the sense die supports a Wheatstone bridge circuit configured to generate a signal based at least in part on a force exerted by the protruding member on the sense die; monitoring a surface stress of the sense die caused by the force exerted by the protruding member on the sense die; and correlating the surface stress and/or deflection to a push force or a pull force applied to the body element relative to the base assembly.

Preferably, the measurement chamber, the body element, the protruding member and the base element are made of a common material, and this material has a CTE close to CTE of the sense die to minimize compensation amount due to thermal mismatch. Even more preferably, the common material has a negative CTE relative to the CTE of the sense die to minimize and/or eliminate compensation needed due to thermal mismatch.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed.

DETAILED DESCRIPTION OF THE INVENTION

Figure 1:
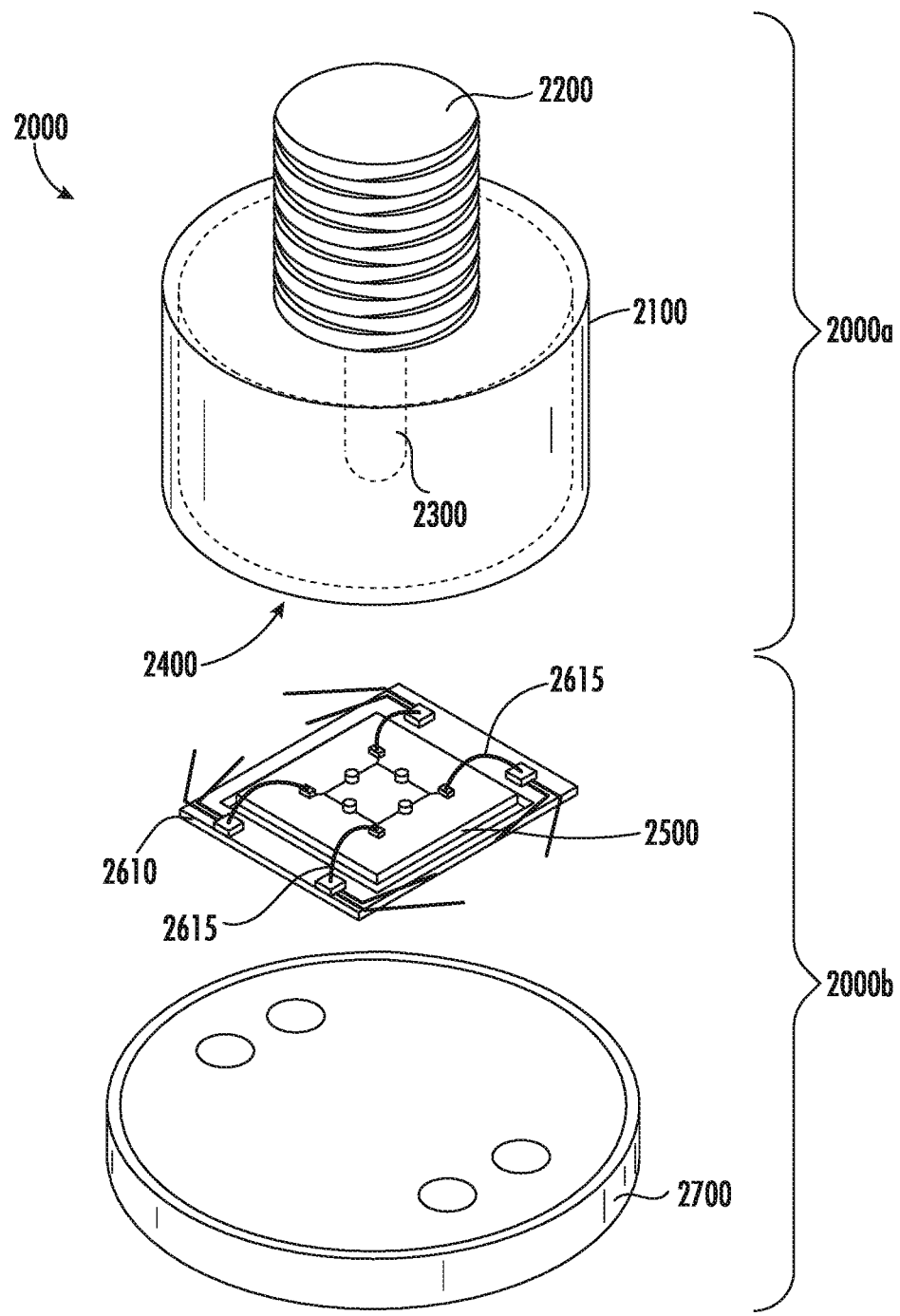
FIG. 1 is a perspective view of a load cell enclosing a force sensor according to certain embodiments.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definition of terms shall apply throughout the application:

The term "comprising" means including but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Load cells provided in accordance with the embodiments discussed herein may be specifically configured for push force (e.g., pressure) measurement and/or pull force (e.g., tensile) measurement. Configurations encompassing a silicon sense die provided together with a body portion as discussed herein may be built into load cell designs to provide a standard platform for load cells having various force measurement ranges. Embodiments discussed herein allow for the use of a single sense die sensing element structure that may be adjusted to accommodate various force measurement ranges.

Certain embodiments incorporate a silicon surface stress sensing concept via a specific implementation of a sense die to enable both push force and pull force measurement via a single device, and also to improve the sensing force range of the sensor. To provide such benefits, load cells as discussed herein comprises a body assembly and a base assembly. The body assembly may comprise: an attachment element configured to fasten the body assembly relative to an external measurement fixture; a body element defining a measurement chamber housing the silicon sense die (and associated Wheatstone bridge for force measurements). As discussed herein, the attachment element may be secured to, and extend away from an exterior surface of the body element. The body assembly may additionally comprise a protruding member positioned within the measurement chamber and extending from an interior surface of a closed end of the measurement chamber toward the open end so as to contact the sense die (and apply a stressing force to the surface of the silicon die). The protruding member may be defined as an at least substantially linear (e.g., cylindrical) protrusion extending from a first end at the interior surface of the closed end of the body element to an opposite distal end. The distal end may have a smooth, rounded tip positioned adjacent to the sense die (discussed herein) of the base assembly, such that the rounded tip applies a stressing force to a surface of the sense die.

The sense die itself may be attached to a base element, which itself is secured onto and/or partially within the open end of the body element, such that the distal end of the protruding member is applying a stressing force onto the surface of the sense die. The base element may be a part of a base assembly, which itself may be secured (e.g., adhered) to an external measurement fixture. The Wheatstone bridge may be configured to correlate the level of stress of the surface of the sense die to a force measured by the load cell. If the sense die is preloaded, such that the protrusion applies a stressing force to the sense die even when no force is applied to the load cell, such that a pull force will result in a measurable decrease in the stress of sense die from the force applied by the protruding member to the sense die, and a push force will result in a measurable increase in the stressing force applied by the protruding member to the sense die. For clarity, the amount of force (pull force and/or push force) may be measured by proxy by the Wheatstone bridge, by measuring the amount of stress of the surface of the sense die. When a load is brought to the center of the die, the Wheatstone bridge produces a differential output voltage from the standard piezoresistive Wheatstone bridge that is proportional to the applied load.

Figure 2:
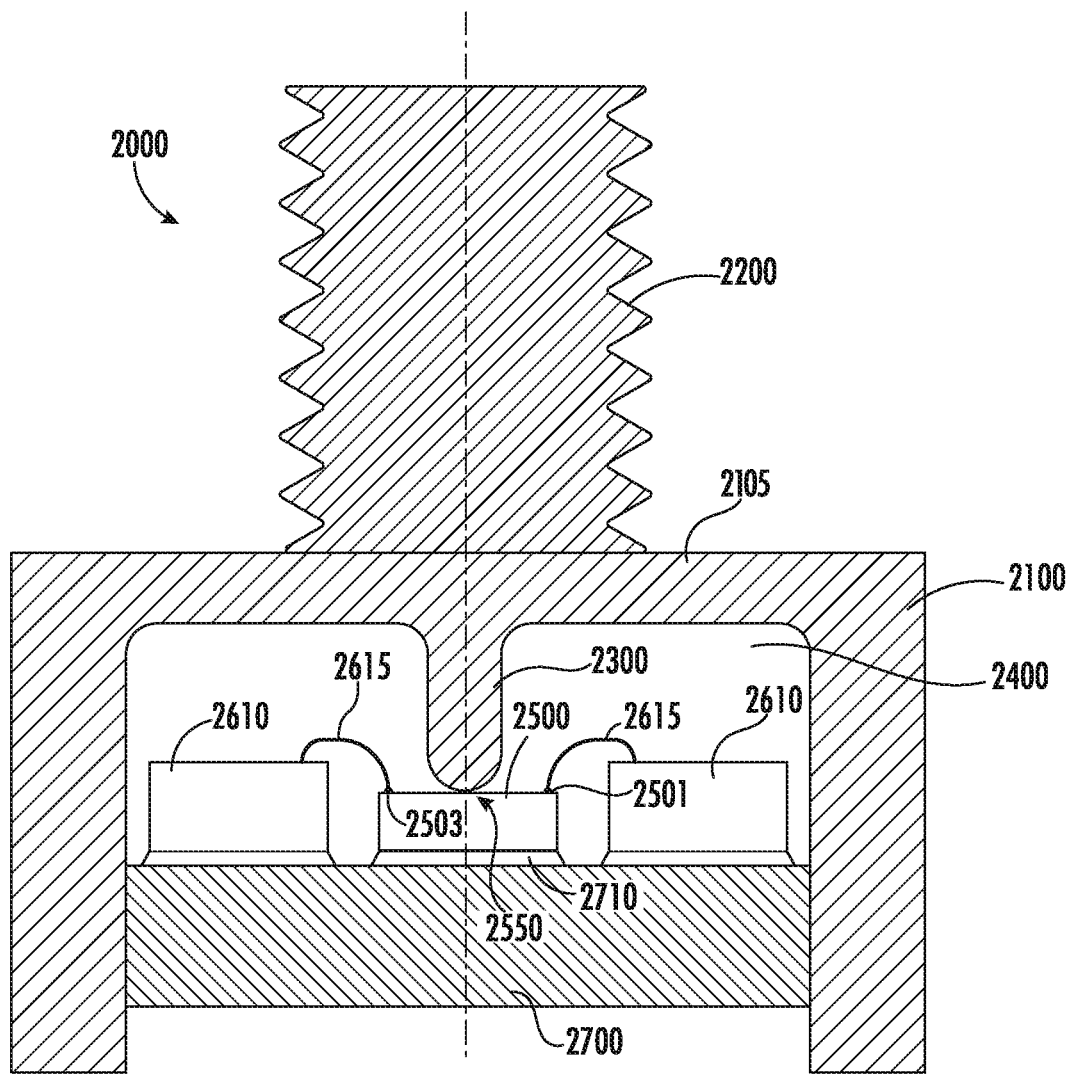
FIG. 2 is a cross-sectional view of the load cell with the force sensor shown in FIG. 1.
Figure 3:
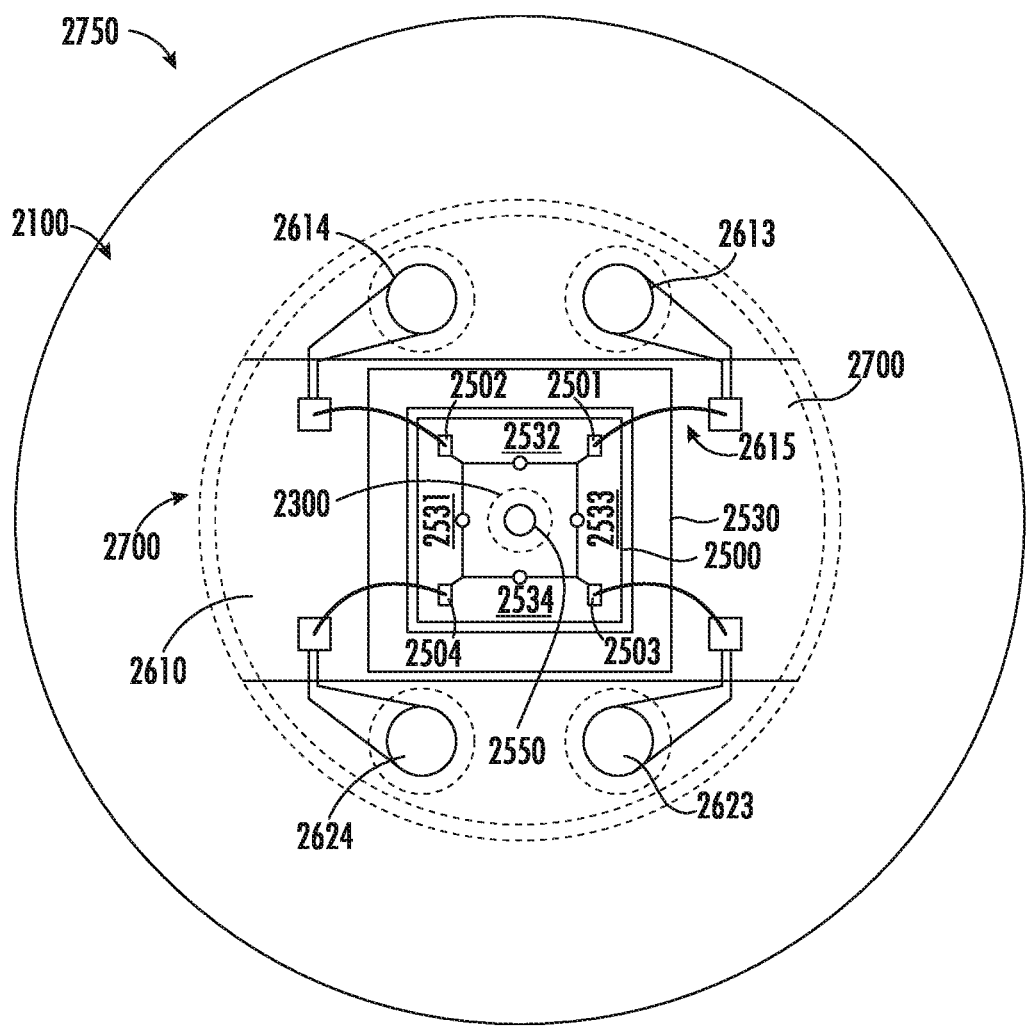
FIG. 3 is a schematic top view of the base assembly including the force sensor of FIG. 1.

FIGS. 1-3 illustrative different views of a load cell having a pressure sensor for sensing a push and/or pull force, according to an embodiment of the disclosure. FIG. 1 is a perspective view of an illustrative load cell. FIG. 2 illustrates a cross-sectional view of the load cell with the pressure sensor of FIG. 1. FIG. 3 illustrates a base assembly of the load cell in FIGS. 1-2.

The disclosed structure as described herein, may be suitable for use in high pressure applications exceeding 250 psi of pressure and/or low pressure applications (e.g., below 50 psi, below 100 grams of force applied to the load cell, and/or the like). In another scenario it may provide a robust sensor arrangement for high pressure applications, as well as lower pressure applications.

As shown in FIGS. 1-2, the load cell 2000 includes a body assembly 2000a and a base assembly 2000b. The body assembly 2000a of the illustrated embodiment may be fabricated from separate components that are subsequently attached together, or the body assembly 2000a may be integrally formed, such as by machining the elements of the body assembly 2000a from a single piece of material. The body assembly 2000a of the illustrated embodiments encompasses three elements: 1) the body element 2100 which forms an upper part of a measurement chamber 2400; 2) an attachment element 2200 disposed on an exterior surface of the body element 2100 (e.g., center-attached integrally on an exterior surface of a closed end 2105 of the body element 2100), and 3) a protruding member 2300 extending from an interior surface of the measurement chamber 2400 defined by the body element 2100 (e.g., an interior surface of the closed end 2105 of the measurement chamber 2400). The protruding member of the illustrated embodiment is generally linear, and may have a generally cylindrical cross-section (although other cross-sectional shapes may be utilized, such as square, triangular, hexagonal, and/or the like) extending from a first end (secured at the interior surface of the measurement chamber 2400) to an opposite, second distal end. In embodiments in which the protruding member extends from the closed end 2105 of the body element 2100, the thickness of the closed end 2105 of the body element 2100 dictates the amount of linear movement of the protruding member 2300 per unit of force applied to the load cell 2000 (and by consequence, as discussed herein, the amount of force the protruding member 2300 applies to the sensing element). For example, a thinner closed end 2105 may be characterized by a greater deformation under load, which translates to a greater linear movement of the protruding member 2300 than a comparable configuration having a thicker closed end 2105. Thus, to adjust the sensitivity of the load cell 2000, the thickness of the closed end 2105 of the body element may be selected to accommodate a desired sensitivity of the load cell 2000. As shown, the protruding member 2300 is parallel to and/or concentric with the measurement chamber 2400. The distal end of the protruding member 2300 of the illustrated embodiment defines has a smooth round tip (e.g., a hemispherical shape) for exerting force to the base assembly 2000b.

As illustrated, the attachment element 2200 may define fastening features, such as threads (e.g., male threads or female threads) to facilitate fastening of the load cell to an external fixture. The body element 2100 of the illustrated embodiment has a cylindrical shape, although it should be understood that the body element 2100 may have any of a variety of shapes, such as rectangular, square, oval-shaped, and/or the like. Moreover, in the illustrated embodiment, the attachment element 2200, body element 2100 (and measurement chamber 2400), and protruding member 2400 are aligned along a central axis of the body assembly. In other embodiments, one or more components, such as the attachment element 2200 may be located off-axis to provide other mounting configurations of the load cell.

In the illustrated embodiment, the measurement chamber 2400 is defined as a hollow interior of the body element 2100. The measurement chamber 2400 has a shape corresponding to the shape of the body element 2100. For example, the measurement chamber 2400 of the illustrated embodiment has a cylindrical shape corresponding to the cylindrical shape of the body element 2100. Sidewalls defining the measurement chamber 2400 may have an at least substantially uniform thickness (measured between an interior surface of the measurement chamber 2400 and an exterior surface of the body element 2100) surrounding the perimeter of the measurement chamber 2400. Moreover, as shown, the measurement chamber 2400 has a closed end 2105 and an opposite open end for mounting the base assembly 2000b such that the sense die 2500 may be positioned adjacent to the distal end of the protruding member 2300 such that the distal end of the protruding member 2300 applies a stressing force to a surface of the sense die 2500 (e.g., the distal end of the protruding member 2300 is pressed into the surface of the sense die 2500).

With continued reference to FIGS. 1-2, the base assembly 2000b includes a base element 2700, a sense die 2500, and a substrate (embodied as an electronic printed circuit board 2610 (PCB) in the illustrated embodiment). The base element 2700 may have a shape corresponding to the shape of the measuring cavity 2400. For example, the base element 2700 may be a round disk (corresponding to a circular measuring cavity 2400); an elongated bar shape having curved ends (corresponding to a circular measuring cavity 2400) configured to contact and contour to the curvature of the interior surface of the measurement chamber 2400 (and linear sides extending between the curved ends); and/or other shapes providing base mounting convenience. For those embodiments in which the base element 2700 is embodied as an elongated bar having curved ends, the base element 2700 may define openings between the linear sides of the base element 2700 and curved internal walls of the measuring cavity 2400, thereby enabling electrical connections (e.g., wires) to pass out of the measuring cavity 2400 (e.g., from connections associated with the sense die 2500), for example, to an external electronic device.

Moreover, the substrate (e.g., PCB 2610) may have a shape corresponding to the shape of the base element 2700 and/or a shape corresponding to the shape of the measurement cavity 2400. In just one embodiment in which the substrate has a round shape (corresponding to the round shape of a measurement chamber 2400) and the base element 2700 has an elongated bar configuration with curved ends (the curved ends configured to contour the round shape of the measurement chamber 2400), electrical connection terminals of the substrate may align with openings defined between the base element 2700 and the curved internal walls of the measuring cavity 2400, thereby facilitating electrical connections between the load cell 2000 and external electronic devices. It should be understood that such embodiments are merely examples, and other configurations may be similarly provided (e.g., the substrate and/or the base element 2700 may have apertures and/or terminals extending therethrough to enable electrical connections to pass from the interior of the measurement chamber 2400 to the exterior of the load cell 2000.

The outside diameter of the base element 2700 is configured to fit within the lower end of the chamber 2400. The base element 2700 may be interference fit with the interior sidewalls of the measurement chamber 2400, or may be secured therein with any other suitable attachment configurations, such as spot welds to secure the base element 2700 within a desired and stable position relative to the measurement chamber 2400 and/or the protruding member 2300. Moreover, the sense die 2500 of the illustrated embodiment is mounted to the base element 2700 with an adhesive 2710, e.g., an epoxy that is UV or thermally curable.

In certain embodiments, the sense die 2500 comprises a single crystal sense wafer secured relative to the upper surface of base assembly 2700 and in electrical connection (e.g., via wire bonds) with circuitry components, which may be defined on one or more PCBs (e.g., a single PCB 2610 having an open center or a plurality of PCBs mounted adjacent to the sense die 2500). The PCB 2610 is also attached to the base element 2500, such as via an adhesive. In the illustrated embodiment, the sense die 2500 outputs are wirebonded to the PCB 2610 via wires 2615 and 2625. The wires and circuitry defined on the PCB provide functions to connect to the load cell electrical outputs to a processor to allow the electrical signal converted to force data from calibration base. The processor may be secured on the PCB or set externally.

FIG. 3 is a schematic top view of the base assembly 2000b which includes a sensing element (e.g., a pressure sensing element) positioned within the measurement chamber 2400 of the body assembly 2000a. As shown, a PCB 2610 is secured on a top surface of the base element 2700. The PCB 2610 shown defines a center cutout to accommodate the single sense die 2500 mounted therein. A Wheatstone bridge circuit formed of four symmetrically designed piezoresistive sensing elements 2531, 2532, 2533, and 2534, mounted in a square geometry on the sense die 2500.

Referring to FIG. 3, the sense die 2500 is a square element. However, other shapes may be suitable for use in various embodiments, such that the sense die 2500 may be rectangular, round, hexagonal (or other polygon-shaped), and/or the like. The square single sense die 2500 is located in the opening defined by the PCB 2610 of the illustrated embodiment. In other embodiments, the sense die 2500 may be positioned centrally relative to a plurality of discrete PCBs fixed relative to the base element 2700, and connected to one or more of the discrete PCBs via one or more wirebonds to form the base assembly 2000b. As shown in FIG. 2, an adhesive 2710 secures the sense die 2500 to the base element 2700. The PCB may be attached to the base with the same or a similar adhesive.

In certain embodiments, the load cell is configured to detect a wide range of forces between a maximum pull force (maximum tensile force) to a maximum push force (maximum pressure force). In other embodiments the load cell may be specifically configured to detect a wide range of pull forces ranging from a minimum pull force to a maximum pull force or the load cell may be specifically configured to detect a wide range of push forces ranging from a minimum push force to a maximum push force. It should be understood that the size of the overall measurement range may be approximately identical for identical components regardless of the calibration configuration (e.g., push/pull, push-only, or pull-only), however the range of force values measured may be shifted based on the calibration.

As discussed herein, the calibration and/or sensitivity of the load cell 2000 may be adjusted based at least in part on the thickness of the closed end 2105 of the body element 2100. As mentioned, a thinner closed end 2105 of the body element 2100 may enable a higher sensitivity of the load cell 2000, as a smaller force applied to the load cell 2000 results in deformation of the closed end 2105 of the body element 2100 and corresponding linear movement of the protruding member 2300 toward or away from the sense die 2500; whereas a thicker closed end 2105 of the body element 2100 may enable higher force capabilities, as a larger force applied to the load cell 2000 is required to deform the closed end 2105 of the body element 2100 to cause a corresponding linear movement of the protruding member 2300 toward or away from the sense die 2500. The output voltage of the sense die 2500 may be measured at one or more known force inputs to the load cell 2000 to calibrate the output of the load cell 2000.

In other embodiments, the load cell 2000 may be calibrated to accommodate a desirable force range by changing the relative location of the sense die 2500 relative to the protruding member 2300 (e.g., moving the sense die 2500 closer to the distal end of the protruding member 2300 creates a higher prestress within the sense die 2500, which enables the load cell 2000 to accommodate a higher pull force; by contrast, moving the sense die 2500 away from the distal end of the protruding member 2300 creates a lower prestress within the sense die 2500, which enables the load cell to accommodate a higher push force).

As yet another example, the sensitivity of the sense die 2500 may be adjusted by changing the location of the Wheatstone bridge piezo resistors to position the Wheatstone bridge piezo resistors closer or farther away from the contact point (where the distal end of the protruding member 2300 contacts the sense die 2500). As yet another example, the sensitivity of the sense die 2500 may be adjusted to a desired sensitivity level by forming and/or adjusting a thickness of a diaphragm at a bottom side of the sense die 2500 (e.g., by etching a bottom side of the sense die 2500, by forming a diaphragm based on an adhesive pattern under the sense die 2500, by changing the sense die 2500 thickness (e.g., by grinding), and/or the like). It should be understood that the foregoing are provided as non-limiting examples of changing a sensitivity and/or calibration of the load cell 2000.

Regardless of calibration, the entire range of force values measured may be detected based on a measured stress of a surface of the sense die 2500 caused by a stressing force applied by the distal end of the protruding member 2300. In certain embodiments, the entire range of deflection of the surface of the sense die (e.g., from a minimum deflection to a maximum deflection) may be at least approximately one micron. For configurations calibrated for measuring both push forces and pull forces, the calibration zero-force point of measured stress of the surface of the sense die should be set at substantially the midpoint of the full measurable stress (and/or deflection distance) of the sense die. In such a configuration, a pull force applied to the load cell may thus result in a measurable decrease in stress of the surface of the sense die (e.g., between the midpoint of the total measurable stress and the minimum measurable stress) and a push force applied to the load cell may result in a measurable increase in stress of the surface of the sense die (e.g., between the midpoint of the total measurable stress and the maximum measurable stress). Again, it should be understood that the calibrated zero-force point may be set as desired to accommodate a desired range of measurement forces (e.g., between a maximum pull force and a maximum push force; between a maximum pull force and a minimum pull force; or between a minimum push force and a maximum push force).

When there is no force acting on the base, output from the bridge circuit should be calibrated to represent a zero force input. When the cell is loaded with a force (e.g., the base assembly 2000*b* is pushed or pulled), the surface of the sense die 2500 is stressed based on relative movement of the protruding member 2300 relative to the surface of the sense die 2500. A movement of the protruding member 2300 into the surface of the sense die 2500 (as a result of a push force applied to the load cell) results in measurably more stress of the surface of the sense die 2500 (and in embodiments in which the distal end of the protruding member 2300 has a hemispherical shape, a larger surface area of the sense die 2500 is stressed (as indicated at 2550 of FIGS. 2-3) as additional surface area of the hemispherical surface of the distal end of the protruding member 2300 is pressed into the surface of the sense die 2500) and a movement of the protruding member 2300 away from the surface of the sense die (as a result of a pull force applied to the load cell) results in measurably less stress of the surface of the sense die 2500 (and in embodiments in which the distal end of the protruding member 2300 has a hemispherical shape, a smaller surface area of the sense die 2500 is stressed (as indicated at 2550 of FIGS. 2-3) as less surface area of the hemispherical surface of the distal end of the protruding member 2300 engages the surface of the sense die 2500). Changes in the stress of the sense die causes a non-zero signal output from the Wheatstone bridge that is at least substantially linearly proportional to the stress and the acting force. Bridge outputs 2501, 2502, 2503, and 2504 are wirebonded out to processing elements, which may be defined on the base element 2700, or may be external to the load cell, in which case wire bonds may extend through connectors either pins or apertures 2613, 2614, 2623, and 2624 within the base 2700.

For a stable test and measurement performance, the load cell must have very stable performance over time. To achieve this, the load cell should be made of a material characterized as having a CTE (Coefficient of Thermal Expansion) which closely matches the CTE for the silicon wafer, or even preferably has a negative CTE relative to the CTE of silicon. The load cell body element 2100, the attachment element 2200, protruding member 2300 and base element 2700 are preferred to be made of the same material. The CTE of sense die is at least approximately 3-5 μm/m/° K. Invar42 (FeNi42) has a CTE at 5.3 μm/m/° K, very close to the CTE of silicon, making Invar 42 a preferred material for certain embodiments to minimize the influence of environmental temperature on force measurements. However, it should be understood that other materials having equivalent CTE may be utilized in certain embodiments. In certain applications, when temperature factors and the required stability of the applications are not critical, the material used for the base can be selected to achieve different price and performance ranges. For example, the distal end of the protruding member 2300 may be constructed of a first material (e.g., Invar42) while the remainder of the body assembly 2000*a* may be constructed of a second material (e.g., a steel).

By ensuring the material of at least a portion of the body assembly (e.g., the distal end of the protruding member 2300) has similar temperature-based expansion properties as the sense die 2500, the load cell provides repeatable force measurements over a wide temperature range.

In constructing the illustrated load cell, attachment element 2200 is secured to an exterior surface of the body element 2100 (e.g., a top surface of the body element), for example, by welding or by integrally machining the body element 2100 and attachment element 2200 as one piece. The attachment element 2200 defines threads (or other coupling mechanisms) which serve as the mounting mechanism to a larger load apparatus. However, it should be understood that other coupling mechanisms may be utilized, such as directly adhering an exterior surface of the body element 2100 to the larger load apparatus. For those configurations utilizing a threaded attachment element 2200, it should be understood that any threading configuration may be utilized. For example, the thread may be a #6-32 UNC 2A thread to connect to standard load cell form factors, to allow for coupling for measurement of push forces and/or pull forces.

The protruding member 2300 may be integrally machined with or solidly mounted on an interior surface of the measurement chamber 2400 of the body element 2100 (e.g., an interior surface of the closed end 2105 of the measurement chamber 2400 extending linearly toward the opposite open end of the measurement chamber 2400). The protruding member 2300, the attachment element 2200 and the sense die 2500 are aligned with the central axis of the load cell to provide consistent and accurate force measurement.

The surface of the sense die 2500 is stressed based on relative movement of the protruding member 2300 relative to the surface of the sense die 2500 as force is applied to the load cell. A movement of the protruding member 2300 into the surface of the sense die 2500 results in measurably more stress of the surface of the sense die 2500 (and in embodiments in which the distal end of the protruding member 2300 has a hemispherical shape, a larger surface area of the sense die 2500 is stressed (as indicated at 2550 of FIGS. 2-3) as additional surface area of the hemispherical surface of the distal end of the protruding member 2300 is pressed into the surface of the sense die 2500) and a movement of the protruding member 2300 away from the surface of the sense die (as a result of a pull force applied to the load cell) results in measurably less stress of the surface of the sense die 2500 (and in embodiments in which the distal end of the protruding member 2300 has a hemispherical shape, a smaller surface area of the sense die 2500 is stressed (as indicated at 2550 of FIGS. 2-3) as less surface area of the hemispherical surface of the distal end of the protruding member 2300 engages the surface of the sense die 2500). Changes in the stress of the sense die causes a non-zero signal output from the Wheatstone bridge that is at least substantially linearly proportional to the stress and the acting force. The Wheatstone bridge circuit typically includes four piezoresistive sensors and is preferably built on a single crystal silicon wafer.

The sense die 2500 is adhered or otherwise secured to a top surface of the base element 2700, along with the PCB 2610, which is adhered or otherwise secured to the top surface of the base element 2700. The sense die 2500 is further connected with the PCB 2610 via the connected wire bonds 2615 and 2625. This assembly is press fitted into the open end of the measurement chamber 2400 of the body element 2100 from the bottom of the chamber. The protruding member 2300 extends into contact with a surface of the sense die 2500 (e.g., the center of the surface of the sense die 2500) when the base element 2700 is mounted relative to the body element 2100 such that the sense die 2500 is positioned within the measurement chamber. The base element 2100 can be welded or otherwise secured to the body element 2100 when its position is confirmed correctly.

Securing the body assembly 2000a relative to the base assembly 2000b is a positionally sensitive process, as the base element 2700 and the sense die 2500 in this configuration typically has about one or a fraction of one micron of full travel from zero to a measurable maximum deflection corresponding to a maximum stress. Thus, the position of the sense die 2500 relative to the protruding member 2300 may be monitored during the assembly process to ensure proper positioning of the sense die 2500 relative to the protruding member 2300. As just one example, the output of the sense die 2500 can be electrically monitored during the assembly process, and movement of the base assembly 2000b into the body assembly 2000a may be stopped when a target output voltage of the sense die 2500 is achieved. This calibration process will be done with a very fine controlled system.

In calibrating the load cell 2000 in order to measure pushing force as well as pulling force, the sense die 2500 should be calibrated for detection of the desired full range of potential applied forces by initially loading the sense die 2500 with at least approximately 50% of its maximum stress (based on the positioning of the sense die 2500 relative to the protruding member 2300) output range to allow the output to change when an increasing push force is applied, as well as when a decreasing push force (attributable to a pull force applied to the load cell) is applied. Further to accommodate accurate measurement of push forces and pull forces from the single load cell, the load cell may be mounted relative to an external fixture via a threaded configuration of the attachment element 2100 (e.g., having #6-32 UNC 2A threads), to allow for tightly fastened to an external fixture to enable coupling to both push and pull.

In certain embodiments, the base element 2700 defines one or more flat portions of a top surface (e.g., which may be formed via milling) to enable pins or apertures 2613, 2614, 2623, and 2624 to extend through the PCB (or other substrate) to allow electrical connections to be made after the product is assembled. These connections could lead to another functional PCB (or other substrate) very easily which could contain an ASIC (Application Specific Integrated Circuit) which could provide for a compensated, calibrated digital output for the device still in this relatively small form factor.

In embodiments configured for measurement of compression (push) force only, the attachment element 2100 could be replaced with just a flat surface (e.g., configured to be adhered to an external device) to both lower cost and shorten the overall load cell design.

As an example, a load cell configured in accordance with various embodiments may have an overall package size of 8 mm diameter with 10 mm length including the base element, body element, and attachment element. However the disclosed load cell is not limited to this size.

In summary, embodiments discussed herein provide a single sense die sensing element structure that may be configured for use in measurement of a variety of force ranges, which may include push forces, pull forces, or both. This design is cost effective at least in part because the sensing structure could be potentially built in large quantities and then married to specific body assemblies for the desired force range. The size of the design would allow this same solution to be built into entirely different families in the test and measurement applications. But also, this design more readily accommodates high volume production to achieve low cost solutions.

What is claimed is:

1. A load cell, comprising:
a body assembly comprising a body element defining a measurement chamber having a closed end and an open end, wherein the body element comprises a protruding member positioned within the measurement chamber and extending from the closed end toward the open end, and wherein the protruding member is integrally machined with an interior surface of the measurement chamber; and
a base assembly secured at the open end of the body element, wherein the base assembly comprises a sense die aligned with the protruding member, wherein a top surface of the sense die supports a circuit configured to generate a signal based at least in part on a force exerted by the protruding member on the sense die,
wherein the protruding member causes a stress in the sense die and the stress in the sense die correlates to a force,
wherein the load cell is prestressed by the protruding member in a zero force condition associated with the load cell, and
wherein the load cell is electronically calibrated to correlate a decrease in the stress within the sense die to a pull force exerted on the load cell, and an increase in the stress within the sense die to a push force exerted on the load cell.

2. The load cell of claim 1, wherein the protruding member defines a first end secured at the closed end of the body element and a second end positioned adjacent the sense die.

3. The load cell of claim 1, wherein an attachment element of the body assembly defines a threaded portion to engage an external measurement fixture.

4. The load cell of claim 1, wherein the body assembly further comprises an attachment element, and the attachment element and the body element are integrally formed from a common material.

5. The load cell of claim 4, wherein the common material and the sense die comprise a substantially matching coefficient of thermal expansion.

6. The load cell of claim 4, wherein the common material is Invar 42.

7. The load cell of claim 1, wherein the body assembly further comprises an attachment element, and the attachment element and the protruding member of the body element are integrally formed from a common material.

8. The load cell of claim 7, wherein the common material and the sense die comprise a substantially matching coefficient of thermal expansion.

9. The load cell of claim 7, wherein the common material is Invar 42.

10. The load cell of claim 1, wherein the base assembly further comprises a base element, and the sense die is attached to the base element.

11. The load cell of claim 10, wherein the sense die is attached to the base element with a thermally cured adhesive or an ultraviolet cured adhesive.

12. The load cell of claim 1, wherein the sense die comprises a crystal silicon wafer.

13. The load cell of claim 1, wherein the circuit is a Wheatstone bridge circuit.

14. The load cell of claim 1, wherein the circuit is defined on one or more Printed Circuit Boards (PCBs), and wherein the one or more PCBs are mounted on the base assembly with an adhesive.

15. The load cell of claim 1, wherein sensitivity of the sense die is configured based on a location of one or more piezoresistive sensors of the circuit with respect to a contact point between the protruding member and the sense die.

16. A method of measuring a force, comprising:
monitoring stress of a sense die of a load cell caused by force exerted by a protruding member on the sense die, the load cell comprising a body assembly and a base assembly, the body assembly comprising a body element defining a measurement chamber having a closed end and an open end, the body element comprising the protruding member and extending from the closed end toward the open end, the base assembly secured at the open end of the body element, and the base assembly comprising the sense die, wherein the protruding member is integrally machined with an interior surface of the measurement chamber, wherein a top surface of the sense die supports a circuit configured to generate a signal based at least in part on a force exerted by the protruding member on the sense die, wherein the protruding member causes a stress in the sense die and the stress in the sense die correlates to a force, and wherein the load cell is prestressed by the protruding member in a zero force condition associated with the load cell;
correlating the stress to a push force or a pull force applied to the body element relative to the base assembly; and
calibrating the load cell to correlate a decrease in the stress within the sense die to the pull force, or an increase in the stress within the sense die to the push force.

17. The method of claim 16, wherein monitoring the stress of the sense die comprises measuring movement of the protruding member.

18. The method of claim 16, wherein monitoring the stress of the sense die comprises measuring movement of the protruding member with respect to the sense die.

19. The method of claim 16, wherein correlating the stress to the push force or the pull force comprises comparing movement of the protruding member with a result of a calibration associated with the load cell.

20. The method of claim 16, further comprising:
adjusting sensitivity of the sense die based on a location of one or more piezoresistive sensors of the circuit with respect to a contact point between the protruding member and the sense die.

* * * * *